(12) United States Patent
De Sanzo et al.

(10) Patent No.: US 8,397,560 B2
(45) Date of Patent: Mar. 19, 2013

(54) SAND LEVEL MONITORING SYSTEM

(75) Inventors: David Joseph De Sanzo, Waterford, PA (US); Wing Yeung Chung, Erie, PA (US); Brian Celidonia, Erie, PA (US); John D. Walker, Erie, PA (US); Richard Hooker, Erie, PA (US)

(73) Assignee: General Electric Company, Schenectady, NY (US)

( * ) Notice: Subject to any disclaimer, the term of this patent is extended or adjusted under 35 U.S.C. 154(b) by 903 days.

(21) Appl. No.: 12/175,096

(22) Filed: Jul. 17, 2008

(65) Prior Publication Data
US 2010/0011854 A1  Jan. 21, 2010

(51) Int. Cl.
*G01F 17/00* (2006.01)
(52) U.S. Cl. .......................................... 73/149
(58) Field of Classification Search .................. 73/149, 73/308, 717, 724, 304 R, 304 C
See application file for complete search history.

(56) References Cited

U.S. PATENT DOCUMENTS

| | | | |
|---|---|---|---|
| 4,098,119 A | 7/1978 | Coats | |
| 4,538,466 A * | 9/1985 | Kerber | 73/724 |
| 4,790,184 A | 12/1988 | Nakanishi | |
| 5,070,832 A | 12/1991 | Hapka et al. | |
| 5,184,511 A | 2/1993 | Barrows et al. | |
| 5,284,105 A | 2/1994 | Wilkins | |
| 5,659,470 A | 8/1997 | Goska et al. | |
| 5,680,791 A | 10/1997 | Joynt | |
| 5,708,412 A | 1/1998 | Proulx | |
| 5,793,705 A * | 8/1998 | Gazis et al. | 367/98 |
| 6,928,868 B2 * | 8/2005 | Ridenour et al. | 73/299 |
| 6,993,967 B2 * | 2/2006 | Forgue | 73/290 V |
| 7,121,140 B2 * | 10/2006 | Lo | 73/305 |
| 7,184,878 B2 | 2/2007 | Malone et al. | |
| 7,337,662 B2 * | 3/2008 | Sato et al. | 73/304 C |
| 7,423,436 B2 * | 9/2008 | Gundlach et al. | 324/662 |
| 7,624,713 B2 | 12/2009 | Tawarada et al. | |
| 2005/0285608 A1 * | 12/2005 | Sato et al. | 324/663 |
| 2008/0173087 A1 | 7/2008 | Kurth | |
| 2009/0251152 A1 * | 10/2009 | Ammann | 324/459 |
| 2009/0254231 A1 * | 10/2009 | Bartling | 701/19 |
| 2010/0051281 A1 | 3/2010 | Shaw | |
| 2011/0056290 A1 * | 3/2011 | Bryant et al. | 73/293 |

FOREIGN PATENT DOCUMENTS

EP   499199 A2 * 8/1992

* cited by examiner

*Primary Examiner* — Lisa Caputo
*Assistant Examiner* — Jamel Williams
(74) *Attorney, Agent, or Firm* — GE Global Patent Operation; John A. Kramer

(57) ABSTRACT

A system for monitoring a sand reservoir includes: (a) a sand reservoir carried on an off-highway vehicle; and (b) at least one sand level indicator carried by the sand reservoir which provides a visual display external to the sand reservoir indicative of the quantity of sand within the sand reservoir.

9 Claims, 13 Drawing Sheets

SAND LEVEL MONITORING SYSTEM

BACKGROUND OF THE INVENTION

This invention relates generally to locomotives and other off-highway vehicles, and more particularly to monitoring of sand levels carried therein.

Off-highway vehicles, particularly locomotives, use sand to increase wheel to rail adhesion and prevent wheel slip during adverse weather conditions such as rain, snow and ice. Sand is either applied manually by the locomotive operator with the push of a button or in some cases, a locomotive control system (LCS) has the ability to apply sand automatically if it detects a wheel slip on any of the locomotive axles. The dry sand is typically stored in four sand reservoirs on the locomotive, two located in the front and two in the rear. The two front sand reservoirs supply sand to the wheels located on the front locomotive truck while the rear sand reservoirs supply sand to the wheels located on the rear locomotive truck. The sand level in the reservoirs is normally checked whenever the locomotive is fueled. Checking the sand level in each of the locomotive sand reservoirs is currently a manual process which requires someone to open the fill lid on each of the locomotive sand reservoirs and check the actual level. The fill lids are typically located high on the locomotive car body thus making access difficult and dangerous for the operator and railroad maintenance personnel.

As part of the pre-departure checklist the locomotive operator will verify the delivery of sand to the wheels. The locomotive operator manually activates the sand system and performs a visual check to verify that sand is actually exiting from the locomotive sand pipes. This procedure only verifies operation of the locomotive sand system at the time of test. The operator and railroad maintenance personnel do not have any way of knowing if one or more of the locomotive sand reservoirs is at or near exhaustion. To compound matters, the sand system on a locomotive is not supervised. Once underway there is no safe and convenient method to verify the sand level in the sand reservoirs. Sand application is indicated when the sand button is depressed regardless of actual sand delivery. This is true even if all sand reservoirs are completely empty or the sand control system malfunctions.

There are many external sources that influence the amount of sand applied by the locomotive sand system. The consistency and moisture content of the sand, temperature and relative humidity, mechanical problems with the sand reservoir and its control mechanisms all influence sand consumption. Because of these inconsistencies, sand is not consumed equally from each of the sand reservoirs. Therefore the sand level in each of the sand reservoirs can vary greatly.

Sand is one of the most-consumed commodities on a railroad, second only to fuel. In order for the railroads to maintain a high level of operating efficiency, sand must be available for the operator and the LCS to apply at all times. The application of sand to the locomotive wheels helps to control wheel slip and increases locomotive adhesion thus avoiding an unwanted power reduction that can cost the railroad time and money. Sand is also applied to the locomotive wheels during an emergency stop condition. Even on dry rails, the application of sand under these conditions will increase locomotive adhesion thus helping to avoid wheel slips and stopping the train in the shortest amount of distance possible.

BRIEF SUMMARY OF THE INVENTION

These and other shortcomings of the prior art are addressed by the present invention, embodiments of which provide a sand level indicating system installed on a locomotive or other off-highway vehicle that gives a visual indication of the sand level within a sand reservoir.

According to one aspect of the invention, a system for monitoring a sand reservoir includes: (a) a sand reservoir carried on an off-highway vehicle; and (b) at least one sand level indicator carried by the sand reservoir which provides a visual display external to the sand reservoir indicative of the quantity of sand within the sand reservoir.

According to another aspect of the invention, a system for monitoring a sand reservoir includes: (a) a sand reservoir carried on an off-highway vehicle; (b) a plurality of sensors mounted to the reservoir at varying heights corresponding to varying levels of sand in the sand reservoir, wherein each sensor is operable to generate a signal indicative of the presence or absence of sand at the position of the sensor; and (c) a visual display located external to the sand reservoir and coupled to the sensors, so as to indicate the quantity of sand within the sand reservoir.

According to another aspect of the invention, a system for monitoring a sand level reservoir of a train power unit locomotive includes: (a) a power unit carrying a sand reservoir; (b) a sand level indicator comprising at least one sensor which generates a signal indicative of the quantity of sand in the sand reservoir; (c) a transmitter coupled to the sand level indicator; and (d) a remote station having a receiver in communication with the transmitter for receiving the signal.

BRIEF DESCRIPTION OF THE DRAWINGS

The invention may be best understood by reference to the following description taken in conjunction with the accompanying drawing figures in which.

DETAILED DESCRIPTION OF THE INVENTION

The concepts embodied in the present invention are broadly applicable to any off-highway vehicle (OHV) that utilizes one or more sand reservoirs for increasing adhesive friction between a wheel surface (or the like) and a travel surface, e.g., roadway or railway. As used herein, the term "off-highway vehicle" refers to vehicles such as locomotives and other railroad power units, other rail vehicles, mining trucks or other construction or excavation vehicles, agricultural vehicles, and the like. Sand reservoirs are most commonly found in railroad locomotives; accordingly the details of the invention will be explained using a locomotive as an example.

Figure 1:
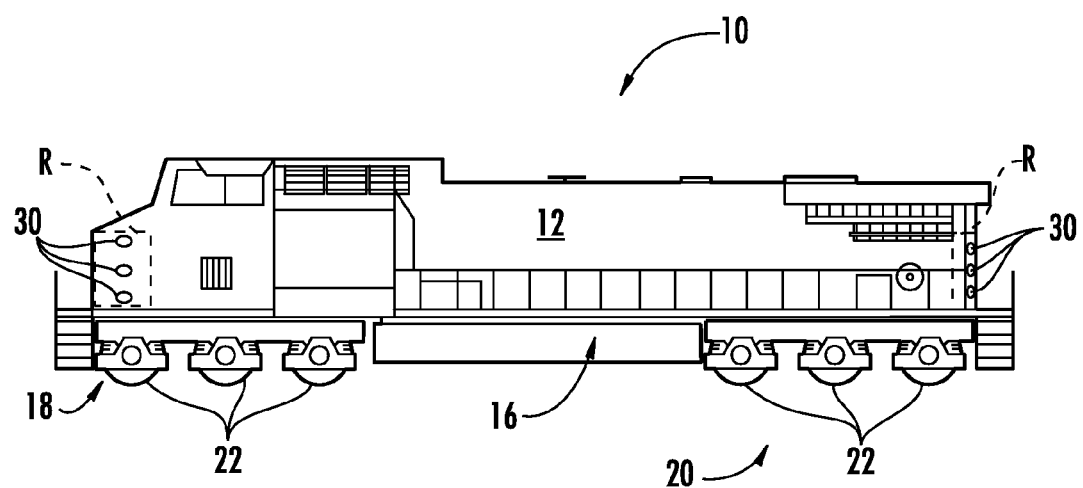
FIG. 1 is a side view of a locomotive incorporating a sand level monitoring system constructed in accordance with an aspect of the present invention.

Now, referring to the drawings wherein identical reference numerals denote the same elements throughout the various views, FIG. 1 depicts a locomotive 10 including a body 12 mounted on a chassis 16 which includes front and rear trucks 18 and 20 respectively. Wheels 22 are suspended from the trucks 18 and 20. The particular locomotive 10 illustrated is a common type in which a prime mover, typically a Diesel engine, drives a generator. Electrical current from the generator is supplied to traction motors which drive the wheels 22.

During periods of poor traction, sand is applied to the rails adjacent the wheels 22. Sand is either applied manually by the locomotive operator with the push of a button or by an automated system in response to wheel slip on any of the wheels 22. The term "sand" as used herein refers both to rock sand (namely, small loose grains of worn or disintegrated rock, typically between 0.06 and 2.0 millimeters in diameter) and to other particulate matter that increases adhesive friction when applied to a travel surface such as a roadway or railway.

Figure 2:
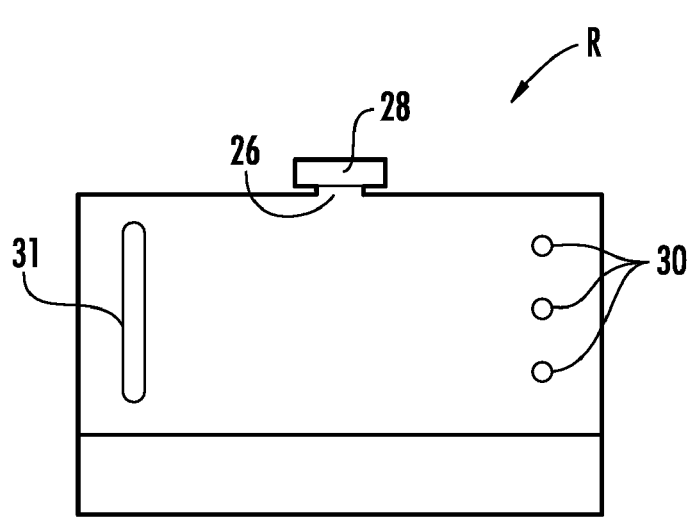
FIG. 2 is a side view of a sand reservoir of the locomotive shown in FIG. 1.
Figure 3:
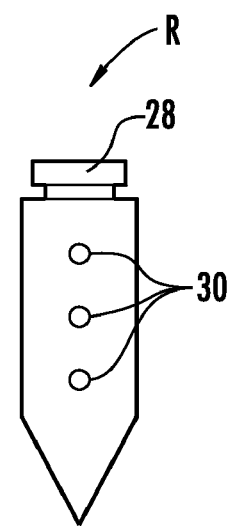
FIG. 3 is an end view of the sand reservoir of FIG. 2.

The dry sand is stored in one or more sand reservoirs "R". In the illustrated example, sand reservoirs R are shown at the front and rear of the locomotive 10. A representative sand reservoir R is shown in FIGS. 2 and 3 and includes a filler neck 26 that is closed off with a filler cap 28.

The locomotive 10 includes at least one level indicator 30 for the sand reservoirs R. As shown in FIG. 1, the level indicators 30 are visible from the exterior of the locomotive 10. Alternatively or in addition, as shown in FIGS. 2 and 3, the level indicators 30 may be mounted to the sand reservoirs R for indication internal to the locomotive 10. Each sand reservoir R includes a plurality of level indicators 30 corresponding to various fill levels.

If desired, all or a portion of the sand reservoir R may be made transparent or translucent so that the sand level may be observed directly through the wall of the sand reservoir R. For example, it may be constructed from transparent or translucent plastic. Alternatively, one or more vertically-elongated openings covered with a transparent or translucent strip may be provided in the wall of the sand reservoir R, as shown at 31 in FIG. 2.

Figure 4:
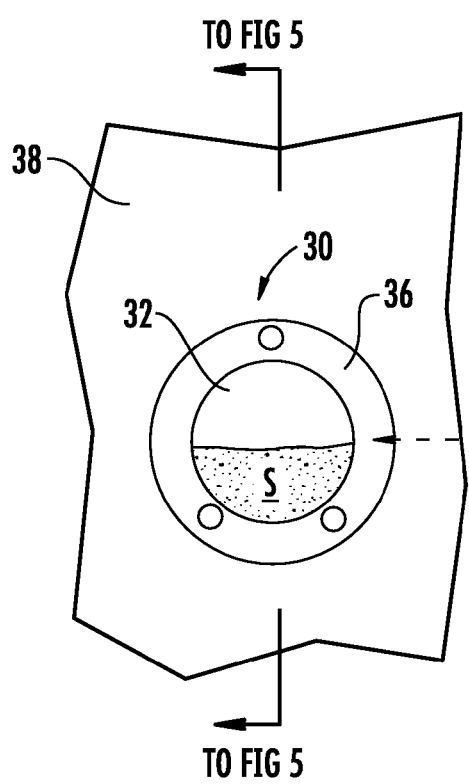
FIG. 4 is a front view of an exemplary sand level indicator constructed according to an aspect of the present invention.
Figure 5:
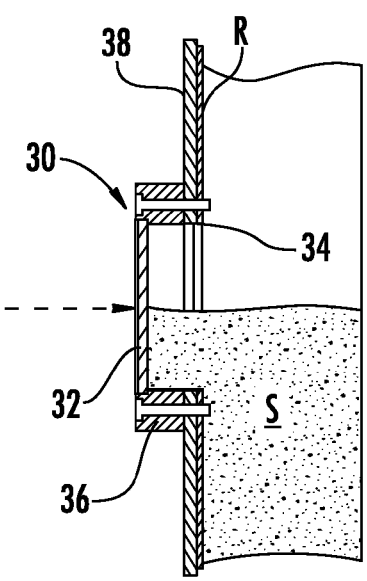
FIG. 5 is a side view of the sand level indicator of FIG. 4.
Figure 6:
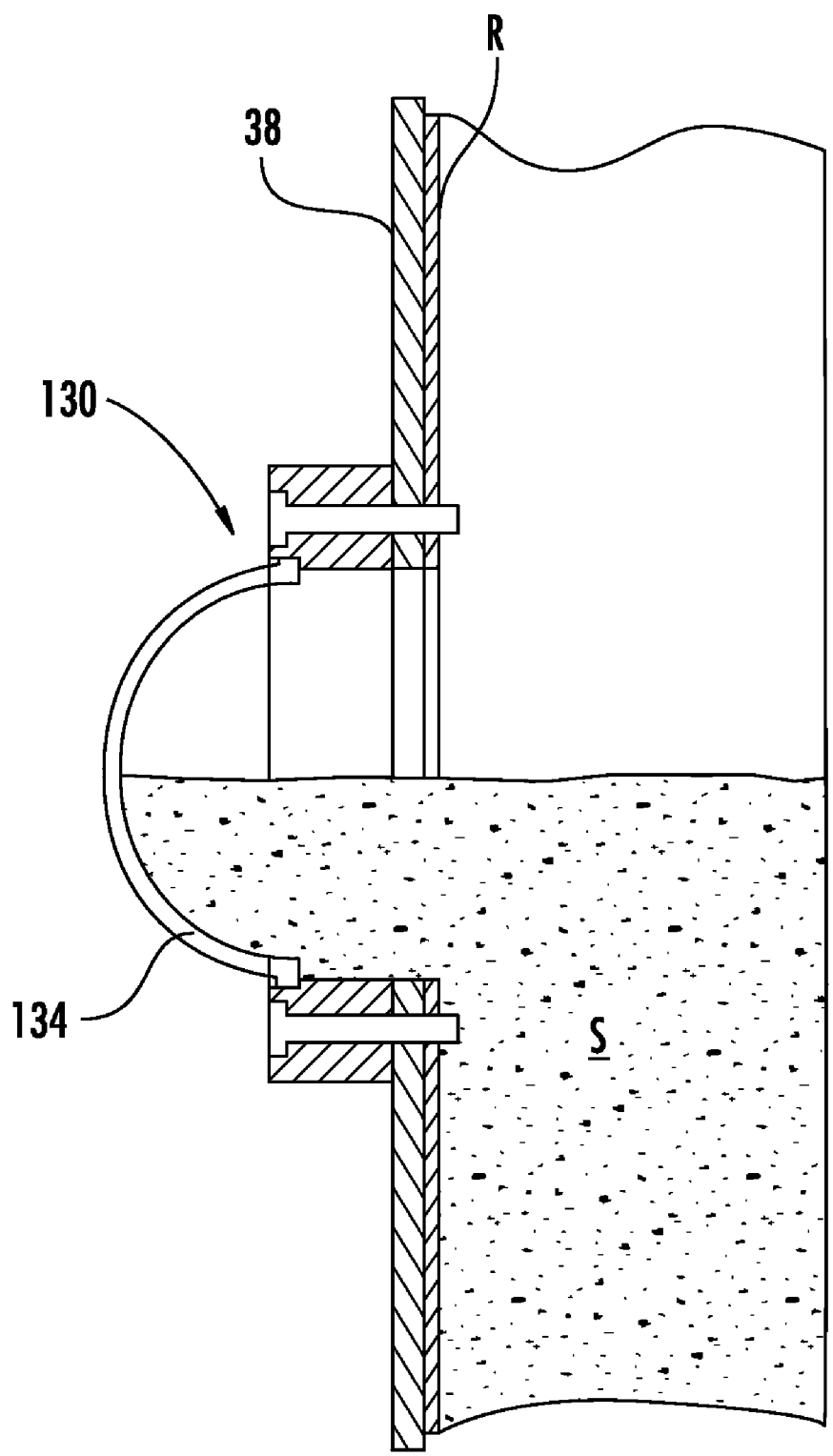
FIG. 6 is a side view of an alternative sand level indicator.

FIGS. 4 and 5 show an exemplary level indicator 30. It comprises a flat transparent lens 32 which is secured over an opening 34 in the wall of the sand reservoir R by a bezel 36. A gasket (not shown) may be used to seal the bezel 36 and lens 32. As shown in FIG. 6 (and FIG. 1) the level indicator 30 is externally visible and therefore penetrates the sand reservoir R and the sidewall 38 of the locomotive body 12. The sand level of the sand "S" is clearly visible, as shown by the dashed arrow. Alternatively, the level indicator 30 may be mounted directly to the sand reservoir R only. In this case the level indicator 30 would be read from the interior of the locomotive 10. Both internal and external indicators 30 may be provided.

FIG. 6 illustrates a level indicator 130 which is similar to the level indicator 30 but which incorporates a convex, protruding lens 134. This may improve visibility in situations where the level indicator 130 cannot be viewed directly head-on.

Figure 7:
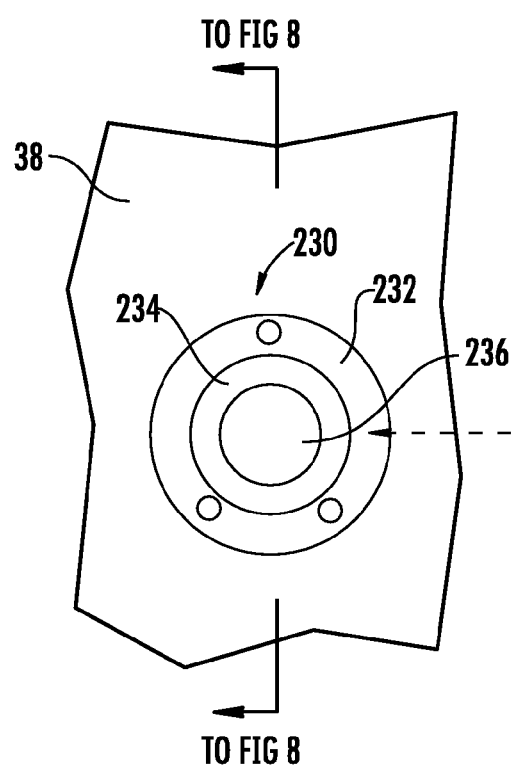
FIG. 7 is a front view of another alternative sand level indicator.
Figure 8:
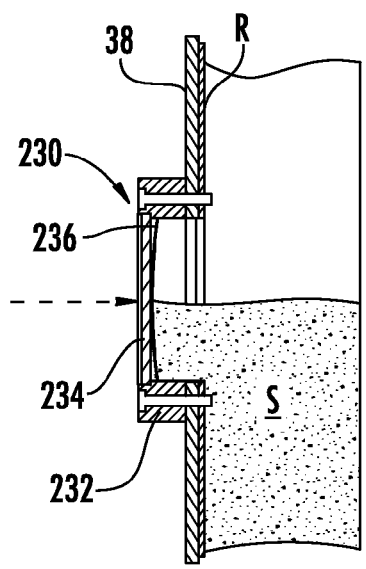
FIG. 8 is a side view of the sand level indicator of FIG. 7.

FIGS. 7 and 8 illustrate another level indicator 230 which is similar to the level indicator 30 and which includes a bezel 232 securing a lens 234. While a flat lens 234 is shown, a protruding lens such as that shown in FIG. 6 may be used as well. A thin resilient membrane 236 is positioned behind the lens 234 and restrained around its edges. The membrane 236 is of a type that changes color in response to pressure applied thereto. When sand S in the sand reservoir R is present at that particular level, it exerts internal pressure on the membrane 236, which causes the color change. As sand S is depleted from the sand reservoir R, the pressure on the membrane 236 is relieved and it will return to its normal state. Any useful color combination may be used for the membrane 236. For example, the normal state may be red, indicating a lack of sand S, while the stressed state is green, indicating the presence of sand S.

Figure 9:
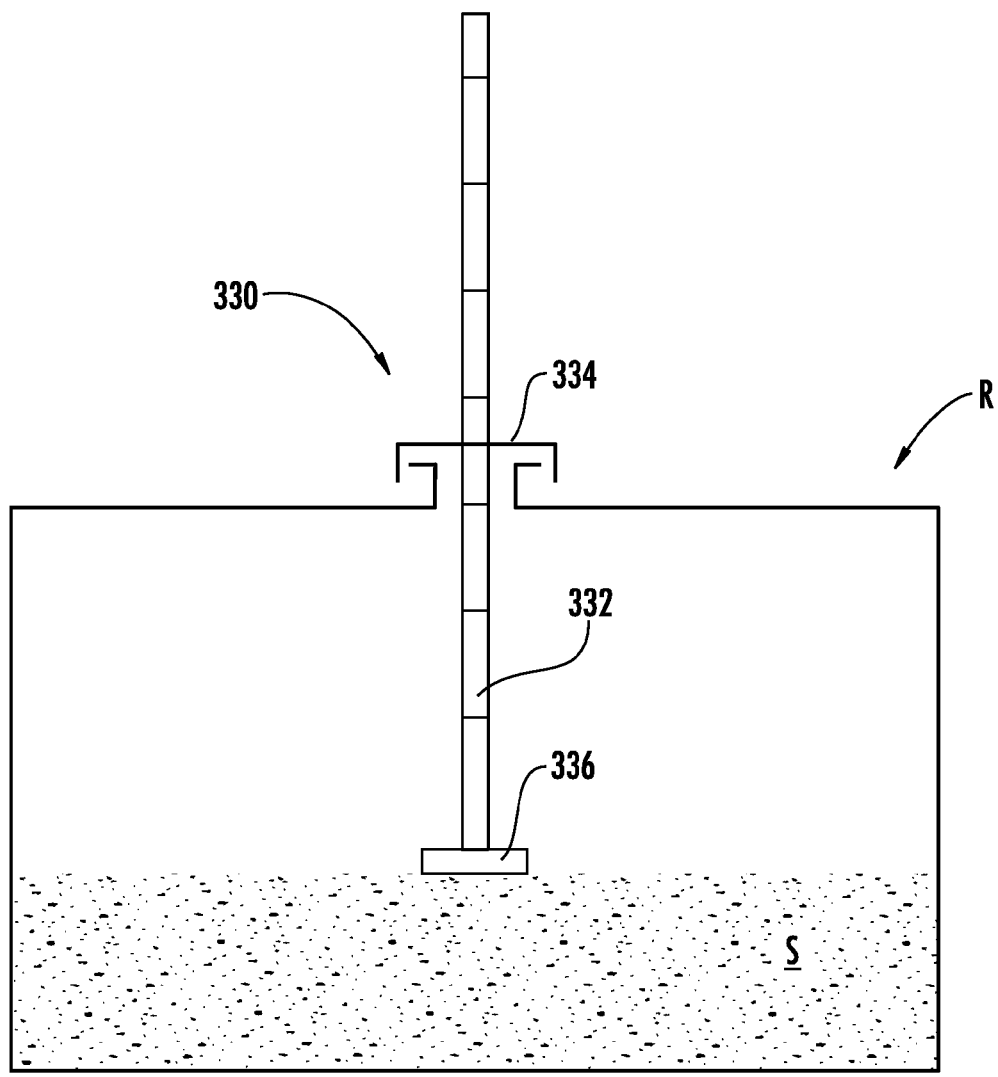
FIG. 9 is a schematic side view of a sand reservoir incorporating another alternative sand level indicator.

FIG. 9 is a cross-sectional view of a sand reservoir R with another type of level indicator 330 installed therein. The level indicator 330 comprises a vertical member 332 (for example a rod, tube, or bar) that is mounted so that it can slide freely up and down of relative to the sand reservoir R. For the sake of convenience it is shown installed in a filler cap 334. The lower end of the vertical member 332 has a foot 336 attached thereto, which provides a large surface area to float or ride on the top of the sand S. The vertical member 332 is provided with suitable calibrated markings to indicate the sand level. The vertical member 332 is removed along with the filler cap 334 when the sand reservoir R is filled and re-inserted after filling is complete. If it is permanently installed, the vertical member 332 is pulled up during filling and then released to contact the sand S when filling is complete.

Figure 10:
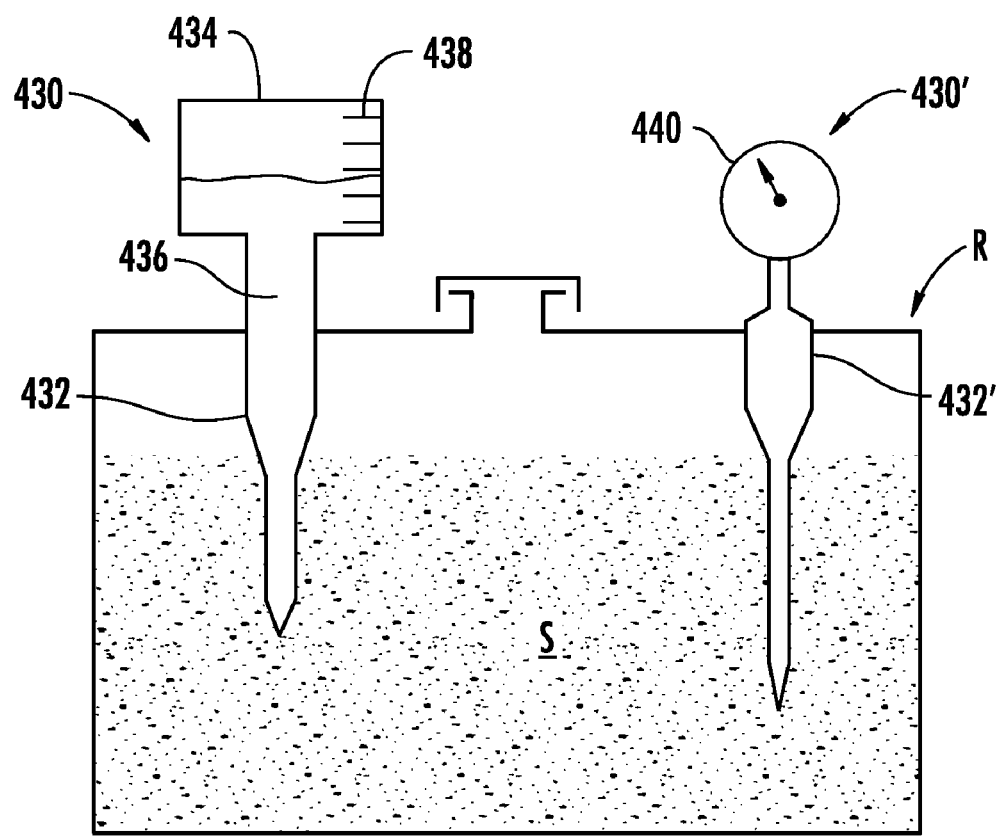
FIG. 10 is a schematic side view of a sand reservoir incorporating another alternative sand level indicator.

FIG. 10 is a cross-sectional view of a sand reservoir R with another type of level indicator 430 installed therein. The level indicator 430 comprises a closed elastic bladder or tube 432 suspended inside the sand reservoir R, spanning a range of sand levels. The upper end of the bladder 432 is connected to a header tank 434 located outside the sand reservoir R. The bladder 432 is filled with a fluid 436 suitably treated to avoid freezing in low temperatures and to provide good visibility, for example, ethylene glycol. The header tank 434 may be made at least partially transparent and is provided with suitable calibrated markings 438 to indicate the fluid level therein. Alternative means of indicating the fluid level, such as a mechanical or electrical float gauge of a known type, could also be used. In operation, sand S exerts pressure on the bladder 432 causing it to collapse and force fluid 436 inside of the bladder 432 into the header tank 434, raising the fluid level. The higher the sand level, the more fluid 436 is displaced. The fluid level inside the header tank 434 would be at its maximum level when the sand reservoir R is full.

FIG. 10 also illustrates a slightly different level indicator 430' including an elastic bladder 432' disposed inside the sand reservoir R, connected to a pressure measuring device 440, such as the illustrated mechanical gauge. The bladder 432' is filled with a fluid (in liquid or gaseous form). Pressure exerted by the sand S causes the bladder 432' to collapse and pressurize the fluid. The higher the sand level, the more the fluid is pressurized, causing a higher reading on the pressure measuring device 440. For either level indicator 430 or 430', to the extent the weight of the fluid would not cause the bladder or tube to re-expand subsequent sand being removed, e.g., due to atmospheric pressure in the sand reservoir, the level indicator may be internally pressurized in compensation.

Figure 11:
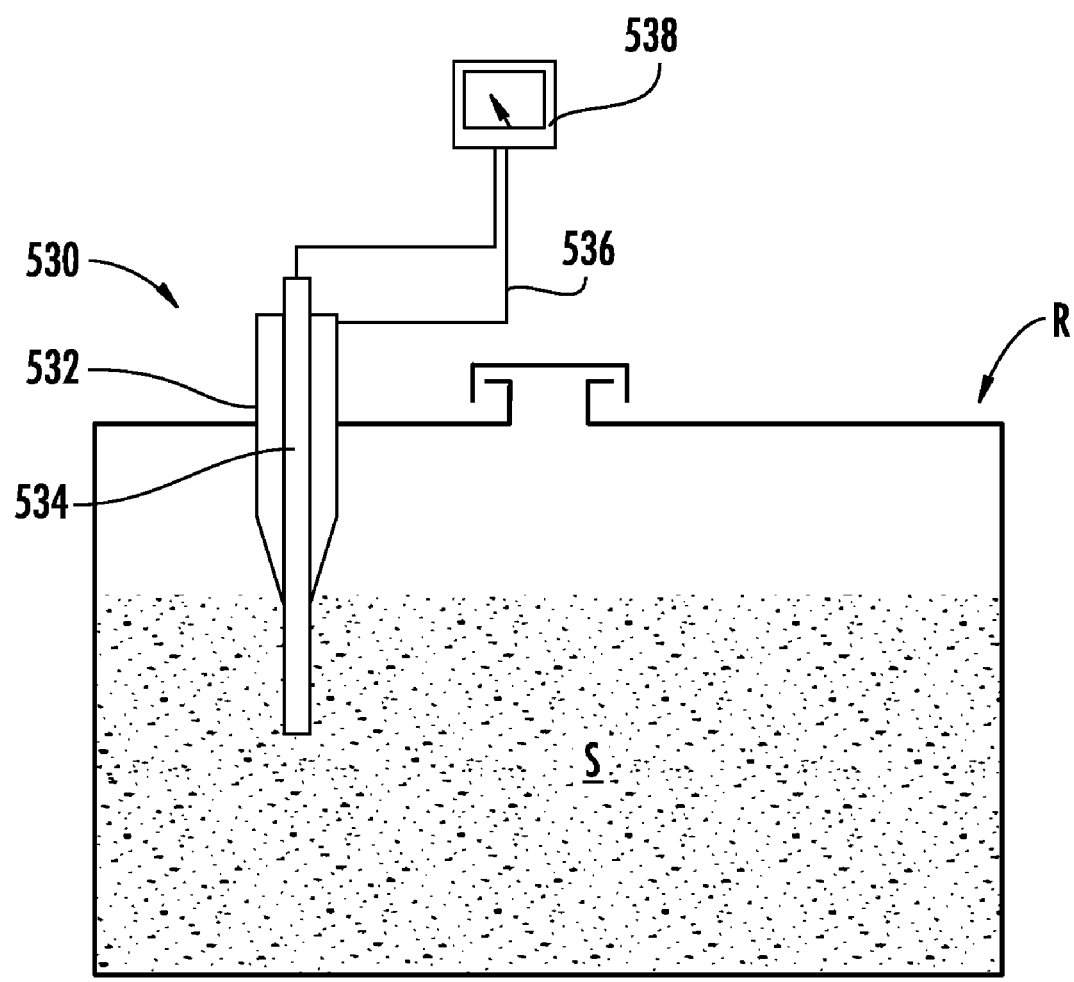
FIG. 11 is a schematic side view of a sand reservoir incorporating another alternative sand level indicator.

FIG. 11 illustrates another type of level indicator 530, which includes an elongated outer member 532 that surrounds an elongated inner member 534. The outer member 532 is resilient, for example it may be constructed from synthetic rubber. At least the outer surface of the inner member 534 and the inner surface of the outer member 532 are made conductive, for example by coating them with a metallic layer. The inner and outer members 534 and 532 are connected by leads 536 to means for measuring the resistance thereof. In the illustrated example a simple ohmmeter 538 is shown, but the leads could also be connected to a CPU or locomotive control system. In operation, sand S exerts pressure on the outer member 532 causing it to collapse and contact the inner member 534, completing the circuit. The inner and outer members 534 and 532 thus collectively form a variable resistor, and the resistance sensed in the circuit can be calibrated to the actual sand level in the sand reservoir R. Other electrical properties which vary with the sand level could also be measured, such as capacitance.

Any of the sand level indicators described above, regardless of type and location, may be provided with lighting for increased nighttime visibility. For example, in the examples shown in FIGS. 2-8, the reservoir interiors may be illuminated for providing a backlighting effect through the level indicators 30. Light sources for backlighting may be continuously lit, or, to reduce power consumption, may be selectively automatically lit based on ambient light levels or selectively manually lit based on switch activation.

Figure 12:
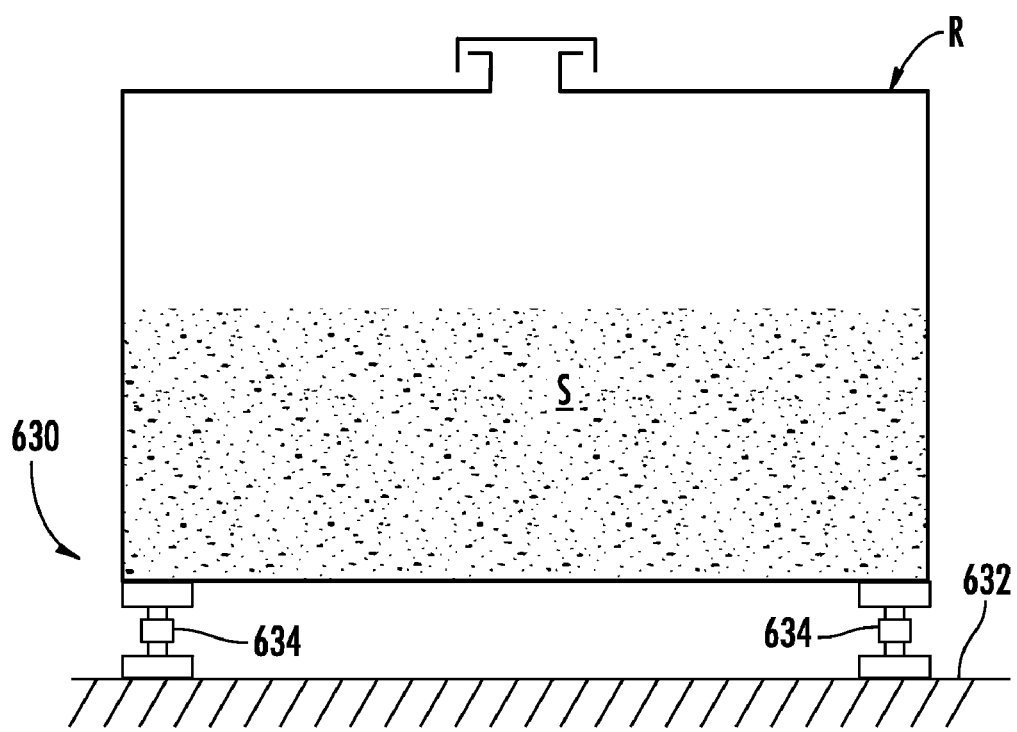
FIG. 12 is a schematic side view of a sand reservoir incorporating a sand level indicating system.

FIG. 12 shows another type of level indicator 630. A sand reservoir R is mounted to the structure 632 (e.g., the body or chassis) of the locomotive 10. The sand reservoir R is supported by weight sensors 634 of a known type, for example load cells. The weight sensors 634 generate a signal indicative of the total weight of the sand reservoir R, which is proportional to the sand level inside. This signal may be used to drive a sand level display, or as an input to a CPU or locomotive control system.

Figure 13:
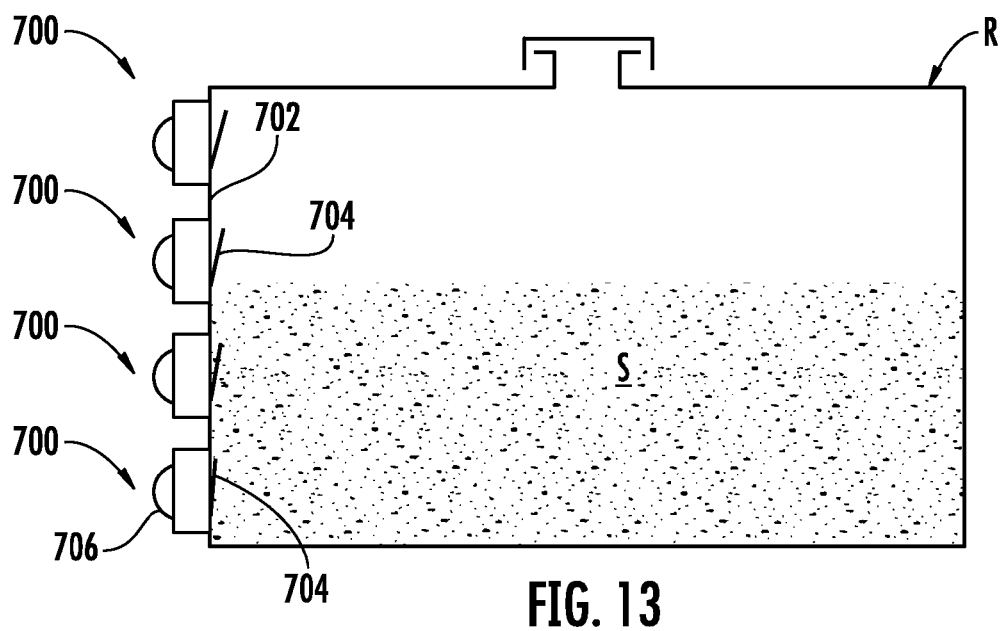
FIG. 13 is a schematic side view of a sand reservoir incorporating an alternative sand level indicating system.
Figure 14:
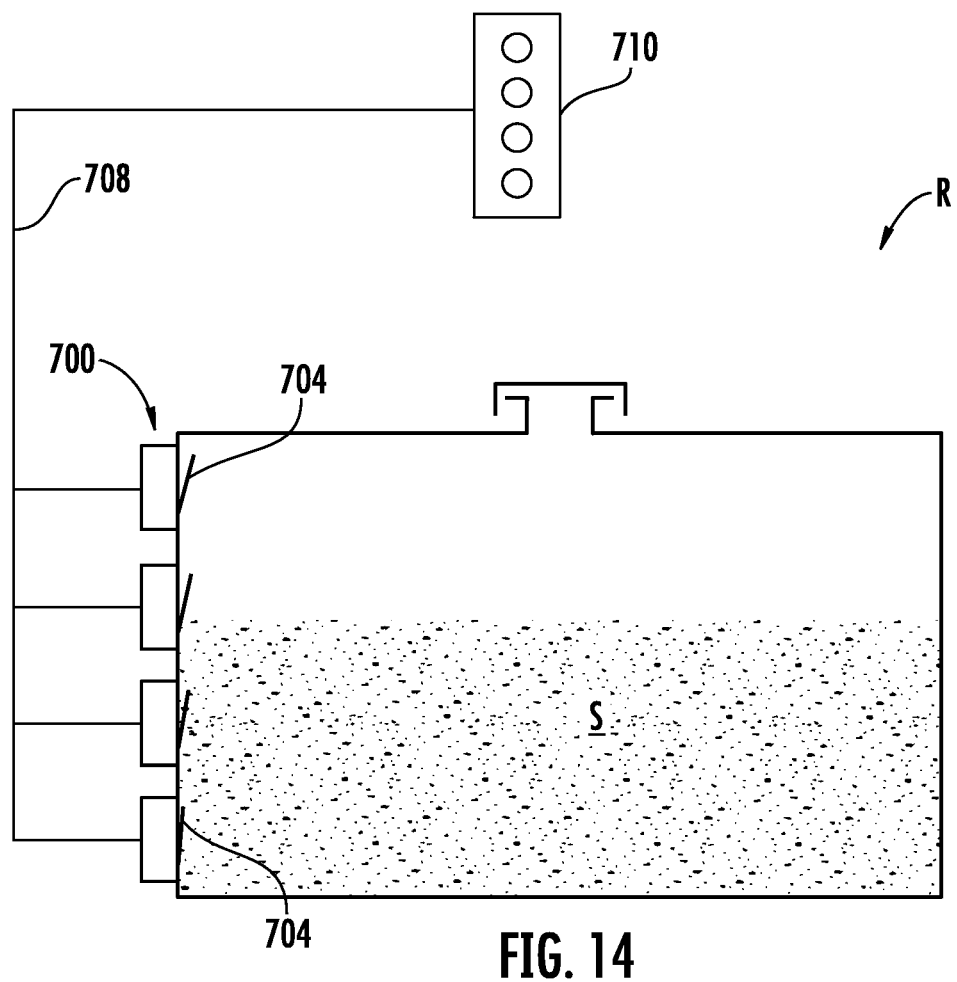
FIG. 14 is a schematic side view of a sand reservoir incorporating another alternative sand level indicating system.
Figure 15:
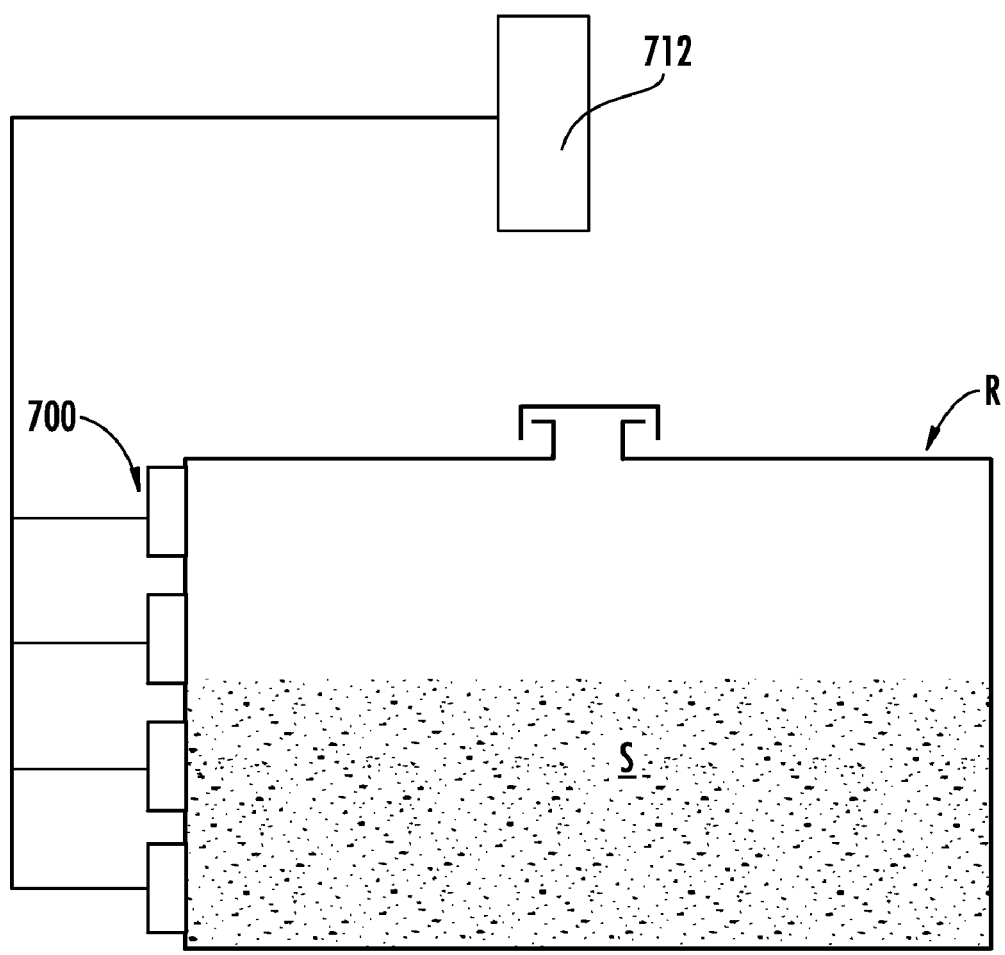
FIG. 15 is a schematic side view of a sand reservoir incorporating another alternative sand level indicating system.

FIGS. 13-15 illustrate a sand reservoir R incorporating another type of sand level indicating system. A plurality of sensors 700 are mounted to the sidewall 702 of the sand reservoir R. Each of the sensors 700 is operable to change a circuit state in response to the presence of sand at the position of the sensor 700, or to generate a signal indicative of the presence of sand at the position of the sensor 700. The number and placement of sensors 700 may be selected to provide the desired degree of resolution in determining the sand level. Nonlimiting examples of suitable transducer technologies that may be used to generate a signal indicating the presence or absence of sand include pressure, temperature, moisture, ultrasonic, infrared, density, piezoelectric, mass, and optical.

In the examples shown in FIGS. 13 and 14, the sensors 700 incorporate leaf-type switches having a moveable arm 704 exposed inside the sand reservoir R. In FIG. 13, each sensor 700 is directly connected to an electric lamp 706 or other type of visual indicator visible on the exterior of the reservoir R, and to an appropriate electrical power supply (not shown). Depending on the type of switch used, the presence of sand may be used to illuminate or extinguish the lamp 706 at each level.

In FIG. 14, the sensors 700 are operably connected (for example through cables 708) to a display 710 which may be placed at a location remote from the sand reservoir R (for example, at an operator's station). The display 710 may comprise a series of lights or a display such as a LED or LCD screen. As shown in FIG. 15, the sensors 700 could also be connected to a locomotive central processing unit (CPU) 712 or part of an integrated locomotive control system (not shown). In this case, the signals generated by the sensors 700 may be subjected to processing or storage before being used to drive a display or for analysis.

Figure 16:
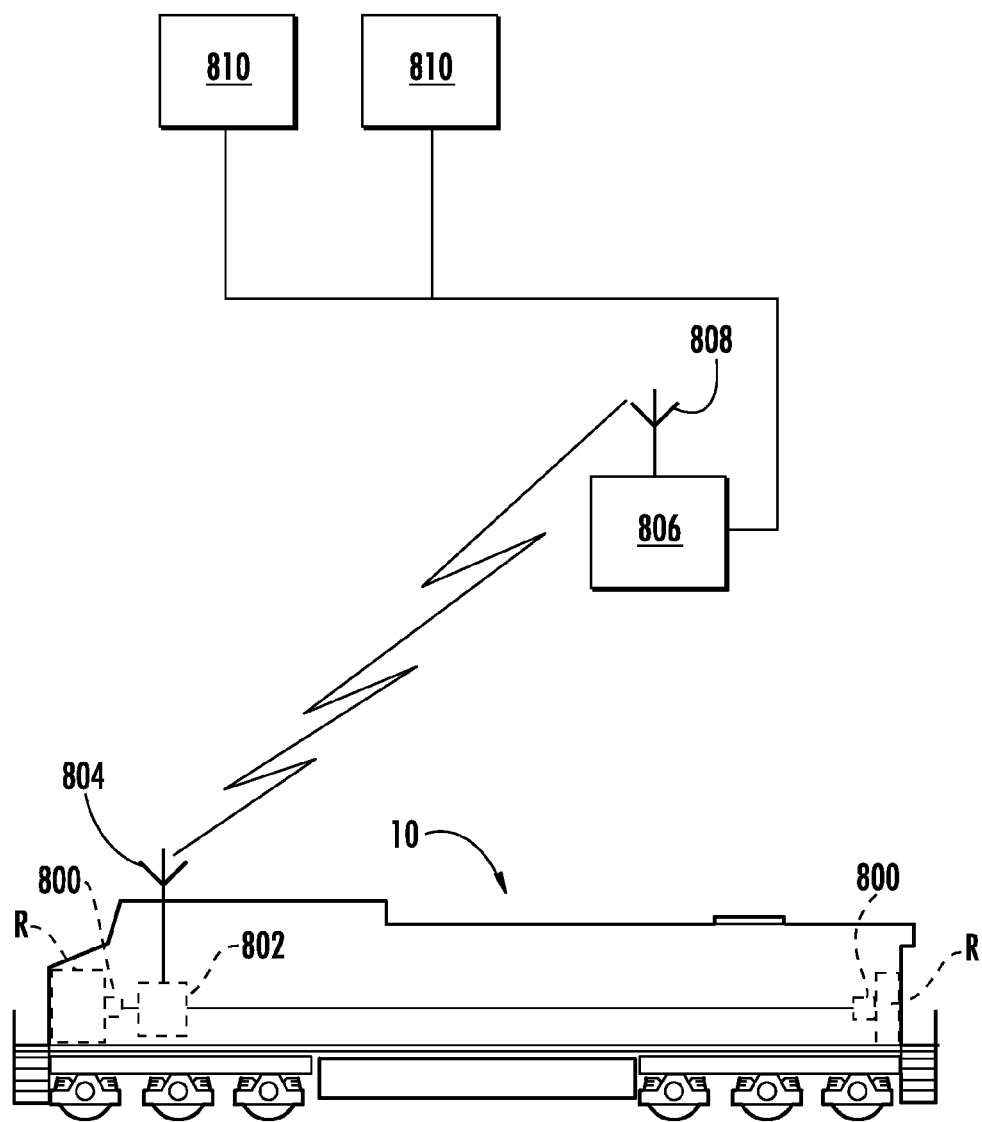
FIG. 16 is a schematic side view of a locomotive incorporating a sand level indicating system with remote communications capability.

Any of the above-described sand level monitoring devices may be incorporated into a network for off-board telemetry. For example, FIG. 16 illustrates a locomotive 10 having fore and aft sand reservoirs R equipped with sand level indicators 800 that are in turn coupled to a CPU 802. The sand level indicators 800 may incorporate any of the types of sensors described above. The CPU is turn coupled to a transmitter 804, which is used to transmit sand level and related data to an external computer 806 that is coupled to a receiver 808. The external computer 806 may be a data server which is in turn connected to multiple client computers 810 through a data network. The sand level and related data is collected and stored by the external computer 806. With access to this data, railroad operating personnel can use the locomotive sand level data for analytic purposes such as: avoiding a locomotive "out of sand" condition; determining the sand level in each of the locomotive sand reservoirs; isolating a malfunction in the locomotive sand system to a particular sand reservoir (front left, front right, rear, etc.) and its associated components; detecting excessive sand usage due to faulty components in the locomotive sand system; monitoring the overall health of the locomotive sand system; triggering an alert if the locomotive sand level has not decreased over a predefined amount of time; evaluating and trending operator traits; and performing billing audits. These analytical functions could also be carried out by the CPU 802 or a locomotive control system on-board the locomotive 10.

The foregoing has described a system for monitoring the amount of sand in a sand reservoir. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A system for monitoring a sand reservoir comprising:
   a sand reservoir carried on an off-highway vehicle;
   a sand level indicator coupled to the sand reservoir, the sand level indicator comprising a display device disposed external to the sand reservoir and configured to provide a visual display indicative of a quantity of sand within the sand reservoir, the sand level indicator comprising:
   (a) an elongated inner member positioned inside the sand reservoir, an outer surface of the inner member being conductive substantially throughout the length thereof;
   (b) a resilient elongated outer member surrounding the inner member, an inner surface of the outer member being conductive substantially throughout the length thereof;
   (c) an electrical circuit connected across the inner and outer members;
   (d) the inner and outer members being disposed within the sand reservoir so that the lengths thereof extend substantially through a height of the sand reservoir to span a range of sand levels within the sand reservoir for indicating a quantity of sand stored in the reservoir based on a height of the sand stored in the sand reservoir, the inner and outer members being arranged such that compression of the outer member against the inner member by sand causes a change in a resistance of the circuit; and
   (e) a display positioned external to the sand reservoir which displays a sand level within the tank based on the resistance.

2. The system of claim 1 wherein the at least one sand level indicator comprises: a first sand level indicator having a visual display visible outside a body of the vehicle; and a second sand level indicator having a visual display visible inside the body of the vehicle.

3. A system for monitoring a sand reservoir of an off-highway vehicle, comprising:
(a) an off-highway vehicle unit carrying a sand reservoir;
(b) a sand level indicator comprising:
  (i) an elongated inner member positioned inside the sand reservoir;
  (ii) a resilient elongated outer member surrounding the inner member; and
  (iii) an electrical circuit connected across the inner and outer member;
  (iv) wherein the inner and outer members are positioned to span a range of sand levels within the sand reservoir, and arranged such that compression of the outer member against the inner member by sand causes a change in a resistance of the circuit; and
  (v) a device operatively coupled to the electrical circuit which is operable to determine a sand level within the tank based on the resistance;
(c) a transmitter coupled to the sand level indicator; and
(d) a remote station having a receiver in communication with the transmitter for receiving the signal.

4. The system of claim 3 wherein the at least one sensor and the transmitter are coupled to a central processing unit located on-board the off-highway vehicle.

5. A system for monitoring a sand reservoir of a locomotive comprising:
a sand reservoir mountable to a locomotive for carrying sand;
a sand level indicator carried by the sand reservoir, the sand level indicator comprising:
  (a) an elongated inner member positioned inside the sand reservoir, an outer surface of the inner member being conductive substantially throughout the length thereof;
  (b) a resilient elongated outer member surrounding the inner member, an inner surface of the outer member being conductive substantially throughout the length thereof;
  (c) an electrical circuit connected across the inner and outer members;
  (d) the inner and outer members being disposed within the sand reservoir so that the lengths thereof extend substantially through a height of the sand reservoir to span a range of sand levels within the sand reservoir for indicating a quantity of sand stored in the reservoir based on a height of the sand stored in the sand reservoir, the inner and outer members being arranged such that compression of the outer member against the inner member by sand causes a change in a resistance of the circuit;
a processor in communication with the circuit, the processor configured to, based on the resistance, generate data corresponding to the quantity of sand for transfer to a remote location; and
a transmitter coupled to the processor and configured to transmit the data to a remote location.

6. The system of claim 5 further comprising a remote station having a receiver in communication with the transmitter for receiving the data.

7. A system for monitoring a sand reservoir of an off-highway vehicle comprising:
an off-highway vehicle;
a sand reservoir mounted to the off-highway vehicle for carrying sand;
a sand level indicator carried by the sand reservoir, the sand level indicator comprising:
  (a) an elongated inner member positioned inside the sand reservoir, an outer surface of the inner member being conductive substantially throughout the length thereof;
  (b) a resilient elongated outer member surrounding the inner member, an inner surface of the outer member being conductive substantially throughout the length thereof;
  (c) an electrical circuit connected across the inner and outer members;
  (d) the inner and outer members being disposed within the sand reservoir so that the lengths thereof extend substantially through a height of the sand reservoir to span a range of sand levels within the sand reservoir for indicating a quantity of sand stored in the reservoir based on a height of the sand stored in the sand reservoir, the inner and outer members being arranged such that compression of the outer member against the inner member by sand causes a change in a resistance of the circuit;
a processor onboard the off-highway vehicle and in communication with the circuit, the processor configured to, based on the resistance, generate data corresponding to the quantity of sand for transfer to a remote location; and
a transmitter coupled to the processor and configured to transmit the data to a remote location.

8. The system of claim 7 further comprising a remote station having a receiver in communication with the transmitter for receiving the data.

9. A sensor for determining an amount of sand in a sand reservoir, comprising:
an elongated inner member adapted to be positioned inside a sand reservoir, an outer surface of the inner member being conductive substantially throughout the length thereof;
a resilient elongated outer member surrounding the inner member, an inner surface of the outer member being conductive substantially throughout the length thereof; and
an electrical circuit connected across the inner and outer member;
wherein the inner and outer are arranged such that a magnitude of a resistance of the electrical circuit will vary in response to compression of the outer member against the inner member by sand.

* * * * *